United States Patent
Childress et al.

(10) Patent No.: US 10,601,840 B2
(45) Date of Patent: **\*Mar. 24, 2020**

(54) SECURITY DETERMINATION

(71) Applicant: INTERNATIONAL BUSINESS MACHINES CORPORATION, Armonk, NY (US)

(72) Inventors: Rhonda L. Childress, Austin, TX (US); Itzhack Goldberg, Hadera (IL); Neil Sondhi, Pilisborosjeno (HU); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/369,768

(22) Filed: Mar. 29, 2019

(65) Prior Publication Data

US 2019/0230093 A1 Jul. 25, 2019

Related U.S. Application Data

(63) Continuation of application No. 16/033,308, filed on Jul. 12, 2018, now Pat. No. 10,333,943, which is a
(Continued)

(51) Int. Cl.
*H04L 29/06* (2006.01)
*H04W 4/70* (2018.01)

(52) U.S. Cl.
CPC .......... *H04L 63/105* (2013.01); *H04L 63/102* (2013.01); *H04L 63/107* (2013.01); *H04W 4/70* (2018.02)

(58) Field of Classification Search
CPC .......................... H04L 63/102; H04L 63/105
See application file for complete search history.

(56) References Cited

U.S. PATENT DOCUMENTS 10,069,840 B2   9/2018   Childress
2008/0270019 A1* 10/2008   Anderson .......... G01C 21/3438
                                                      701/533
(Continued)

FOREIGN PATENT DOCUMENTS

WO   2008055181 A2   5/2008
WO   2013108238 A1   7/2013

OTHER PUBLICATIONS

Anonymous; I was picked up while hitchhiking on the Hume Highway in the 1990s by a dangerous mane and it wasn't Ivan Milat; Retrieved from the Internet Nov. 29, 2015; URL: http://indymedia.org.au/2010/01/10/i-was-picked-up-while-hitchhiking-on-the-hume-highway-i . . . ; 31 pages.

(Continued)

*Primary Examiner* — Harunur Rashid
(74) *Attorney, Agent, or Firm* — Schmeiser, Olsen & Watts; Mark C. Vallone

(57) ABSTRACT

A method and system for determining user security is provided. The method includes registering a first user associated with a service provider system by retrieving identification information for the first user and a first user communication device. In response, Internet of things (IOT) devices belonging to the first user are detected. A second user associated with the service provider system is registered by retrieving identification information for the second user and a second user communication device. In response, IOT devices belonging to the second user are detected. A request for a service provided by the service provider system is received from the first user via the first user communication device belonging to the first user.

17 Claims, 5 Drawing Sheets

Related U.S. Application Data continuation of application No. 15/138,894, filed on Apr. 26, 2016, now Pat. No. 10,069,840.

(56) References Cited

U.S. PATENT DOCUMENTS

| | | | |
|---|---|---|---|
| 2008/0277183 A1* | 11/2008 | Huang | B60R 25/00 180/271 |
| 2012/0053793 A1 | 3/2012 | Sala | |
| 2013/0105573 A1 | 5/2013 | Love | |
| 2013/0311374 A1 | 11/2013 | Seifert | |
| 2014/0244710 A1* | 8/2014 | Sharma | H04L 67/12 709/201 |
| 2016/0027079 A1* | 1/2016 | Schoeffler | H04N 5/23293 705/325 |
| 2017/0310679 A1 | 10/2017 | Childress | |
| 2018/0332048 A1 | 11/2018 | Childress | |

OTHER PUBLICATIONS

Friedman, Mark J.; List of IBM Patents or Patent Applications Treated as Related; Apr. 5, 2019; 1 page.

Gartner IT Glossary; Identity-Proofing Services; Retrieved from the Internet Nov. 29, 2015; URL: http://www.gamer.com/it-glossary/identity-proofing-services; 2 pages.

Goggle Play; Codle Tech App; Retrieved from the Internet Nov. 29, 2015; URL: https://play.google.com/store/apps/details?id=com.codletech.imontremp; 4 pages.

Huynh, Diana; Where Have All the Hitchhikers Gone? A New Freakonomics Radio Podcast; Freakonomics.com; Oct. 10, 2011; 3 pages.

IDchecker.com; 10/12 Webinar: Achieve Compliance and Increase Revenue for Mobile; Retrieved from the Internet Nov. 29, 2015; URL: http://www.idchecker.com/; 5 pages.

Litan, Avivah; Experian Identity Proofing Services Compromised; more bad news on the Data Broker front; Gartner Blog Network; Oct. 21, 2013; Retrieved from the Internet Nov. 29, 2015; URL: http://blogs.gartner.com/avivah-litan/2013/10/21/experian-identity-proofing-services-comprom . . . ; 7 pages.

miiCard Claims API; Retrieved from the Internet Nov. 29, 2015; URL: http://www.miicard.cmo/for/developers/claims-api; 23 pages.

miiCard.com; miiCard Opens API to First Global Trusted ID as a Service Platform; Oct. 3, 2012; Retrieved from the Internet Nov. 20, 2015; URL: http://www.miicard.com/news/201210/miicard-opens-api-first-global-trusted-id-service-platform; 3 pages.

Perman, Stacy; Is Uber Dangerous for Women?; Marie Claire; May 20, 2015; 6 pages.

RealMe; Verified Identity Privacy Statement; Retrieved from the Internet Nov. 29, 2015; URL: https://www.relame.govt.nz/privacy/verified-identity-privacy-statement/; 7 pages.

Tanz, Jason; How AirBnB and Lyft Finally Got Americans to Trust Each Other; Wired.com; Apr. 23, 2014; 24 pages.

Taxi Drivers: Years of Living Dangerously; Lovelock Pharmacy; Retrieved from the Internet Nov. 29, 2015; URL: https://lovelockpharmacy.cmo/libaray.php?id=646377; 6 pages.

Wikipedia; Uber (company)); Retrieved from the Internet Nov. 29, 2015; URL: https://en.wikipedia.org/wiki/Uber_(company)); 1 page.

* cited by examiner

SECURITY DETERMINATION

CROSS REFERENCE TO RELATED APPLICATIONS

This application is a continuation application claiming priority to Ser. No. 16/033,308 filed Jul. 12, 2018, now U.S. Pat. No. 10,333,943, issued Jun. 25, 2019, which is a continuation application claiming priority to Ser. No. 15/138,894 filed Apr. 26, 2016 now U.S. Pat. No. 10,069,840 issued Sep. 4, 2018, the contents of which are hereby incorporated by reference.

FIELD

The present invention relates generally to a method for determining user service security and in particular to a method and associated system for determining transportation security with respect to a user.

BACKGROUND

Accurately identifying a user providing a service typically includes an inaccurate process with little flexibility. Determining fraudulent activities with respect to performing specified functions associated with multiple users may include a complicated process that may be time consuming and require a large amount of resources. Accordingly, there exists a need in the art to overcome at least some of the deficiencies and limitations described herein above.

SUMMARY

A first aspect of the invention provides a security determination method comprising: registering, by a processor of a hardware device in response to a command from a first user, the first user associated with a service provider system, wherein the registering the first user comprises retrieving identification information for the first user and a first user communication device belonging to the first user; detecting and registering, by the processor, Internet of things (IOT) devices belonging to the first user; storing, by the processor within a database belonging to a service provider, the identification information for the first user and the first user communication device belonging to the first user and identification information for the IOT devices belong to the first user; registering, by the processor in response to a command from a second user associated with the service provider system, the second user associated with the service provider system, wherein the registering the second user comprises retrieving identification information for the second user and a second user communication device belonging to the second user; detecting and registering, by the processor, IOT devices belonging to the second user; storing, by the processor within the database, the identification information for the second user and the second user communication device belonging to the second user and identification information for the IOT devices belong to the second user; and receiving, by the processor from the first user via the first user communication device belonging to the first user, a request for a service provided by the service provider system.

A second aspect of the invention provides computer program product, comprising a computer readable hardware storage device storing a computer readable program code, the computer readable program code comprising an algorithm that when executed by a processor of a hardware device implements a security determination method, the method comprising: registering, by the processor in response to a command from a first user, the first user associated with a service provider system, wherein the registering the first user comprises retrieving identification information for the first user and a first user communication device belonging to the first user; detecting and registering, by the processor, Internet of things (IOT) devices belonging to the first user; storing, by the processor within a database belonging to a service provider, the identification information for the first user and the first user communication device belonging to the first user and identification information for the IOT devices belong to the first user; registering, by the processor in response to a command from a second user associated with the service provider system, the second user associated with the service provider system, wherein the registering the second user comprises retrieving identification information for the second user and a second user communication device belonging to the second user; detecting and registering, by the processor, IOT devices belonging to the second user; storing, by the processor within the database, the identification information for the second user and the second user communication device belonging to the second user and identification information for the IOT devices belong to the second user; and receiving, by the processor from the first user via the first user communication device belonging to the first user, a request for a service provided by the service provider system.

A third aspect of the invention provides a security determination method comprising: registering, by a processor of a hardware device in response to a command from a first user, the first user, wherein said registering said first user comprises retrieving identification information for said first user, and wherein said identification information for said first user comprises a first photograph of said first user; storing, by the processor within a data repository belonging to a service provider, the identification information for the first user; providing, by the processor to the first user, an identification token; analyzing, by the processor, the identification token; and receiving, by the processor from a second user via a first communication device, a replica token of the identification token and a request for a service provided by a service provider system.

The present invention advantageously provides a simple method and associated system capable of accurately identifying a user providing a service.

DETAILED DESCRIPTION

Figure 1:
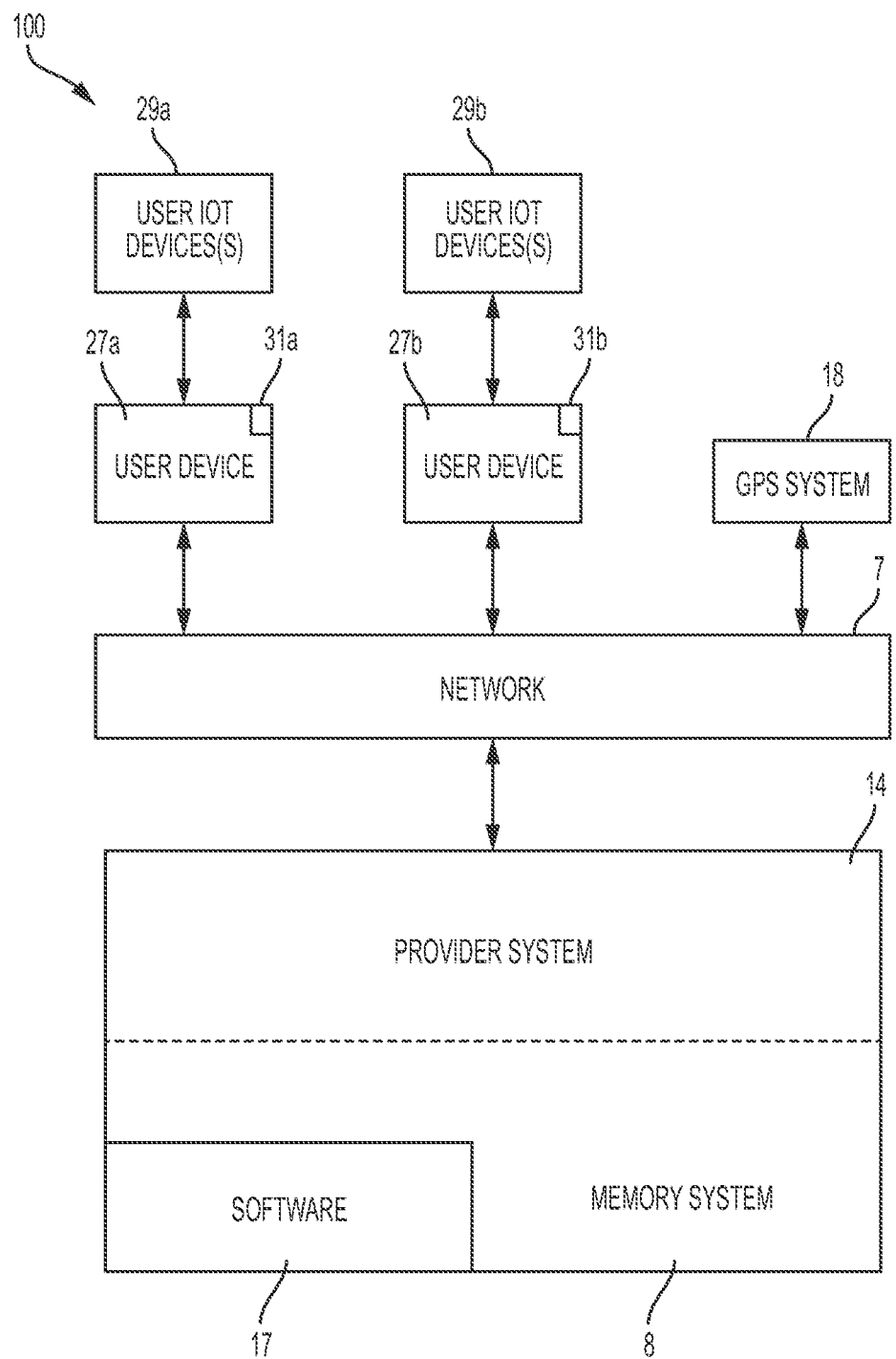
FIG. 1 illustrates a system for providing information associated with individuals for verifying creditability, in accordance with embodiments of the present invention.

FIG. 1 illustrates a system 100 for providing information associated with individuals for verifying creditability, in accordance with embodiments of the present invention. IDs and information associated with the individuals may include a snapshot or additional information to verify identities and integrity. The information may be comprised by an identification token that may be scanned or photographed and individualized such that each individual may not receive a same identification token from a same service provider. For example, an identification token may include, inter alia, a one dimensional barcode, a two dimensional barcode, an alphanumeric string, etc.

System 100 enables a process for verifying identities and integrity (e.g., identifying a driver or passenger prior to getting into vehicle) such that a snapshot of an individual may be retrieved and verified via a social network or a service provider to determine if it is safe to interact with each other (e.g., ride in a same vehicle) based on prior experience and familiarity with each other. A verification process may be enabled prior to an interaction to disclose private information. Therefore, system 100 enables a process for delivering a high level of certainty with respect to a validation process via a central trusted entity (e.g., provider system 14). For example, an individual (e.g., a user requesting a ride to an airport) may sign up with a service (e.g., a ride share service or a cab service) and a security check is enabled to certify the individual. Each certified individual (e.g., the rider and the driver) is assigned an identification (ID) number. The ID number may comprise a permanent or temporary ID number comprising an expiration date. When two individuals engage in a transaction they exchange ID numbers. The IDs numbers are transmitted to the to the service provider. In response, the service provider may return a photo of the certified individuals to verify identities. Alternatively, a barcode sticker may replace the ID numbers such that an individual may enable a photo matching process. The individual associated with the barcode may authorize the service provider to transmit the associated photograph. For example, the individual associated with the barcode may authorize a specified timeframe for processing the barcode. Therefore, system 100 increases a level of safety as all individuals are notified that they are not anonymous and may be tracked down. The following ID related processes may be enabled by system 100 of FIG. 1:

An ID number may be activated by an individual such that a service provider is able to transmit ID information during activation. The ID number may comprise an expiration scenario associated with a number of times it may be executed.

System 100 of FIG. 1 includes a user device 27a (sensing user optional Internet of things (IOT) devices 29a), a user device 27b (sensing optional user Internet of things (IOT) devices 29b), and a GPS system 18 connected through a network 7 to a provider system 14. Provider system 14, user device 27a, IOT devices 29a, user device 27b, IOT devices 29b, and GPS system 18 each may comprise an embedded computer. An embedded computer is defined herein as a dedicated computer comprising a combination of computer hardware and software (fixed in capability or programmable) specifically designed for executing a specialized function. Programmable embedded computers may comprise specialized programming interfaces. Additionally, Provider system 14, user device 27a, IOT devices 29a, user device 27b, IOT devices 29b, and GPS system 18 may each comprise a specialized hardware device comprising specialized (non-generic) hardware and circuitry (i.e., specialized discrete non-generic analog, digital, and logic based circuitry) for executing a process described with respect to FIGS. 1-4. The specialized discrete non-generic analog, digital, and logic based circuitry may include proprietary specially designed components (e.g., a specialized integrated circuit designed for only implementing an automated process for providing information associated with individuals for verifying creditability). Provider system 14 includes a memory system 8 and software 17. User device 27a and 27b may comprise mobile devices such, inter alia, as smart phones. User device 27a comprises a sensor/detection device(s) 31a for sensing or detecting any of user IOT devices 29a. Sensor/detection device(s) 31a may include, inter alia, GPS sensors, barcode readers, RFID readers, temperature sensors, infrared sensors, video retrieval devices, etc. User IOT devices 29a comprise optional devices and may comprise, inter alia, smart phones, pagers, optical head mounted display/glasses, IOT enabled clothing, etc. User IOT devices 29a comprise optional devices and may comprise any type of sensor capable of being detected by sensor 31a such as, inter alia, a barcodes, an RFID tag, a GPS sensor, etc. User device 27b comprises a sensor/detection device(s) 31b for sensing or detecting any of user IOT devices 29b. Sensor/detection device(s) 31b may include, inter alia, GPS sensors, barcode readers, RFID readers, temperature sensors, infrared sensors, video retrieval devices, etc. User IOT devices 29b may comprise, inter alia, smart phones, pagers, optical head mounted display/glasses, IOT enabled clothing, etc. User IOT devices 29b may comprise any type of sensor capable of being detected by sensor 31b such as, inter alia, a barcodes, an RFID tag, a GPS sensor, etc. The memory system 8 may include a single memory system. Alternatively, the memory system may include a plurality of memory systems. Network 7 may include any type of network including, inter alia, a local area network, (LAN), a wide area network (WAN), the Internet, a wireless network, etc. Provider system 14 may retrieve/generate GPS coordinates based data (from GPS system 18) in response to identification instructions.

System 100 enables a setup process for registering a user of a service (e.g., a user requiring a ride) and a provider of a service (e.g., a driver for providing a ride) as follows: Both parties register with provider system 100. A smartphone and IOT devices for each party may be registered. And associated information is stored for later use. IOT devices differ from a device used to transmit/receive pickup information. IOT devices comprise secondary mechanisms for authentication.

Figure 2:
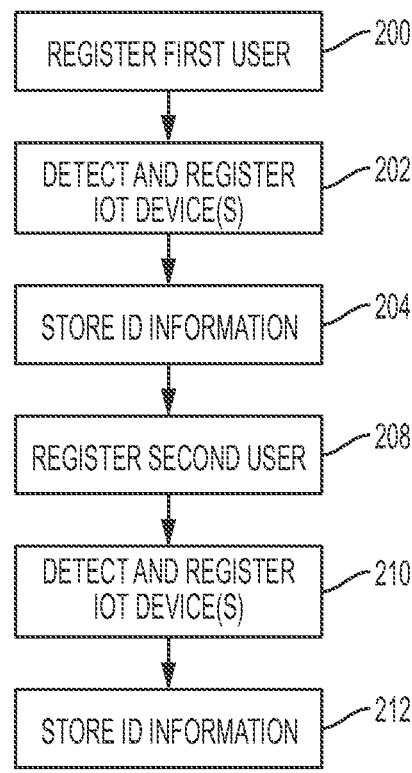
FIG. 2 illustrates an algorithm detailing a process flow enabled by the system of FIG. 1 for registering a user and a provider of a service, in accordance with embodiments of the present invention.

FIG. 2 illustrates an algorithm detailing a process flow enabled by system 100 of FIG. 1 for registering a user and a provider of a service, in accordance with embodiments of the present invention. Each of the steps in the algorithm of FIG. 2 may be enabled and executed in any order by a computer processor(s) executing computer code. In step 200, a first user associated with a service provider system (e.g., a user requiring a ride to a specified location) is registered by retrieving identification information for the first user and a first user communication device belonging to the first user. In step 202, Internet of things (IOT) devices belonging to the first user are detected and registered. In step 204, all retrieved information from steps 200 and 202 is stored in a database (or data repository) belonging to a service provider. In step 208, a second user associated with a service provider system (e.g., a driver) is registered by retrieving identification information for the second user and a second user communication device belonging to the second user. In step 210, Internet of things (IOT) devices belonging to the second user are detected and registered. In step 212, all retrieved information from steps 208 and 210 is stored in a database belonging to the service provider.

Figure 3:
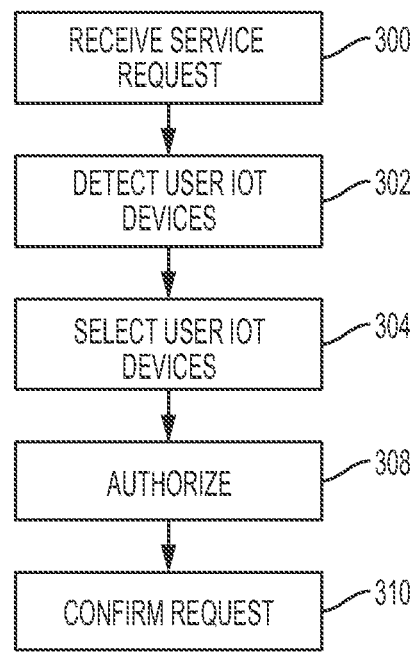
FIG. 3 illustrates an algorithm detailing a process flow enabled by the system of FIG. 1 for initializing a request for a service registered in the algorithm of FIG. 2, in accordance with embodiments of the present invention.

FIG. 3 illustrates an algorithm detailing a process flow enabled by system 100 of FIG. 1 for initializing a request for a service registered in the algorithm of FIG. 2, in accordance with embodiments of the present invention. Each of the steps in the algorithm of FIG. 3 may be enabled and executed in any order by a computer processor(s) executing computer code. In step 300, a request (for providing a service such as a ride) from the first user is received (by the service provider computing system) via the first user communication device. In step 302, first user IOT devices (belonging to and within range of the first user communication device of the first user) are detected. Additionally, second user IOT devices (belonging to and within range of the second user communication device of the second user) are detected. In step 304, a first user IOT device (of the detected first user IOT devices) is selected (i.e., randomly or specifically) for verification. Additionally, a second user IOT device (of the detected second user IOT devices) is selected (i.e., randomly or specifically) for verification. In step 308, the first user IOT device is authorized with respect to the first IOT devices belonging to the first user and the second first user IOT device is authorized with respect to the second IOT devices belonging to the second user. In step 310, the service request (of step 300) is confirmed based on results of steps 302, 304, and 308.

Figure 4:
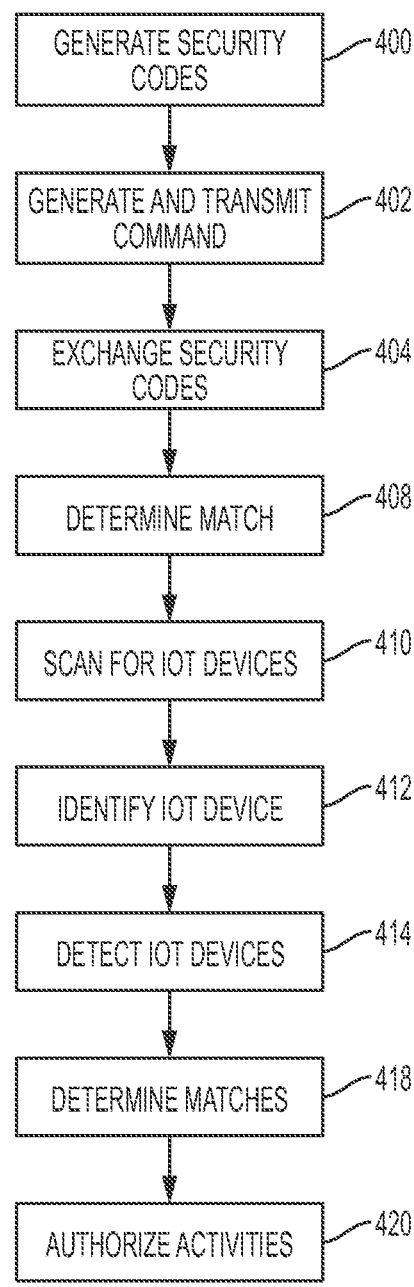
FIG. 4 illustrates an algorithm detailing a process flow enabled by the system of FIG. 1 for authorizing activities requested in the algorithm of FIG. 3, in accordance with embodiments of the present invention.

FIG. 4 illustrates an algorithm detailing a process flow enabled by system 100 of FIG. 1 for authorizing activities requested in the algorithm of FIG. 3, in accordance with embodiments of the present invention. Each of the steps in the algorithm of FIG. 4 may be enabled and executed in any order by a computer processor(s) executing computer code. In step 400, a first user security code for the first user is generated via the first user communication device. Additionally, a second service provider user security code for the second user is generated via the second user communication device. In step 402, a command instructing the second user to proceed to a location of the first user is generated and transmitted to the second user. In step 404 (upon the second user arriving at the location of the first user), the second user security code is transmitted to the first user communication device and the first user security code is provided (by the first user) to the second user. In step 408, a security code match between the second user security code and the first user security code is determined. In step 410, the second IOT devices belonging to the second user are scanned via the first user communication device. In step 412, first data identifying the second user IOT device is received (by the provider system) and second data identifying the first user IOT device is transmitted to the second user communication device. In step 414, the second user IOT device is detected via the first user communication device and the first user IOT device is detected via the second user communication device. In step 418, a first match between the first data and the second user IOT device is determined. Additionally, a second match between the second data and the first user IOT device is detected. In step 420, service activities between the first user and the second are authorized based on the matches determined in steps 4

Figure 5:
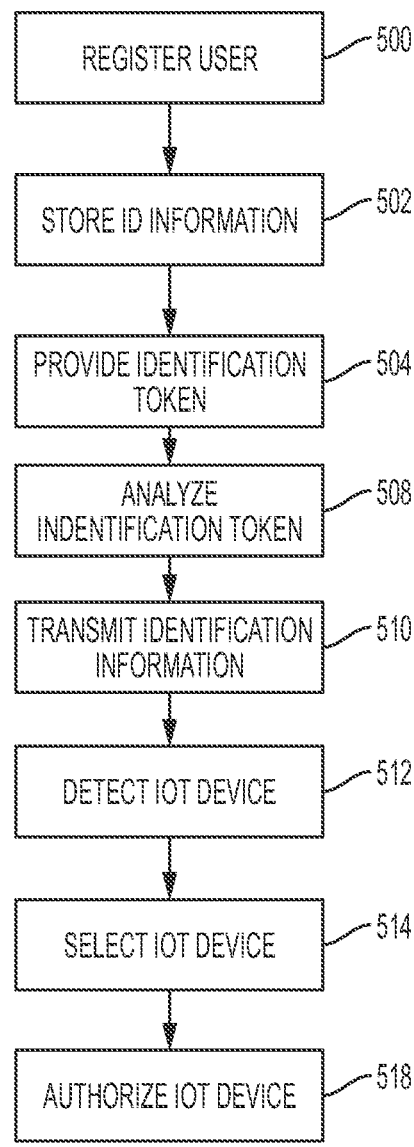
FIG. 5 illustrates an alternative algorithm detailing a process flow enabled by the system of FIG. 1 for providing information associated with individuals for verifying credibility, in accordance with embodiments of the present invention.

FIG. 5 illustrates an alternative algorithm detailing a process flow enabled by system 100 of FIG. 1 for providing information associated with individuals for verifying creditability, in accordance with embodiments of the present invention. Each of the steps in the algorithm of FIG. 5 may be enabled and executed in any order by a computer processor(s) executing computer code. In step 500, a first user is registered in response to a command from the first user. The registration process may include retrieving identification information (for the first user) that includes a photograph of the first user. In step 502, the Identification information is stored within a data repository belonging to a service provider. In step 504, an identification token is provided to the first user. In step 508, the identification token is analyzed. In step 510, a replica token of the original identification token and a request for a service provided by a service provider system is received from a second user via a first communication device. In step 512, the identification information for the first user is transmitted to a second user communication device of a second user in response to results of the analysis of step 508. In optional step 512, a first user IOT device belonging to the first user and within range of the first communication device. In step 514, the first user IOT device is selected (from IOT devices belonging to the first user) for verification. In step 518, the first user IOT device is authorized with respect to the IOT devices belonging to the first user.

Figure 6:
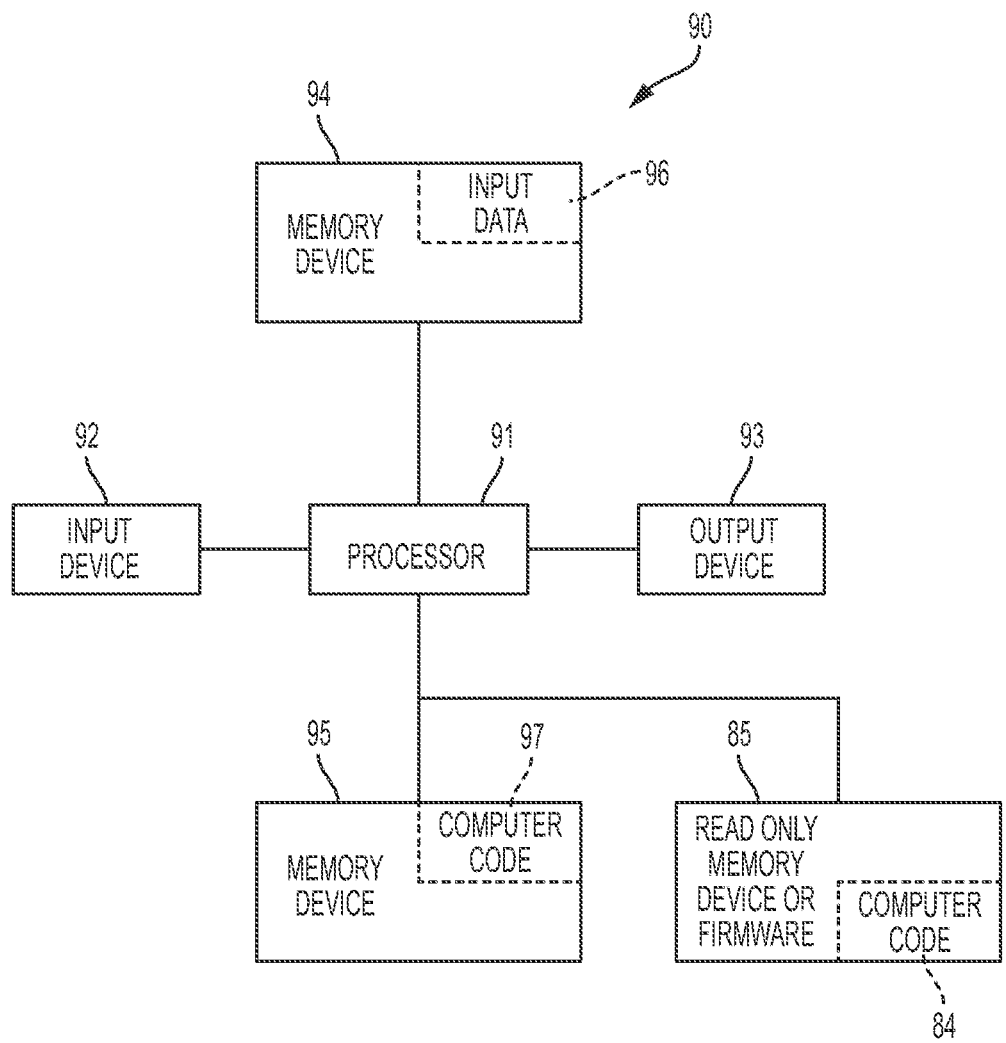
FIG. 6 illustrates a computer system used by the system of FIG. 1 for enabling a process for providing information associated with individuals for verifying creditability, in accordance with embodiments of the present invention.

FIG. 6 illustrates a computer system 90 (e.g., provider system 14, user device 27a, IOT devices 29a, user device 27b, IOT devices 29b, and GPS system 18) used by or comprised by the system of FIG. 1 for enabling a process for providing information associated with individuals for verifying creditability, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-5) for enabling a process for providing information associated with individuals for verifying creditability. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithms of FIGS. 2-5) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithm) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to provide information associated with individuals for verifying creditability. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for providing information associated with individuals for verifying creditability. In another embodiment, the invention provides a business method that performs the process steps of the invention on a subscription, advertising, and/or fee basis. That is, a service supplier, such as a Solution Integrator, could offer to enable a process for providing information associated with individuals for verifying creditability. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A security determination method comprising:
 registering, by a processor of a hardware device in response to a command from a first user, said first user associated with a service provider system, wherein said registering said first user comprises retrieving identification information for said first user and a first user communication device belonging to said first user, and wherein said identification information for said first user comprises a first photograph of said first user and a temporary identification number comprising a specified expiration date and an associated number of times that said temporary identification number is used;
 storing, by said processor within a database belonging to a service provider, said identification information for said first user and said first user communication device belonging to said first user and identification information for detected and registered TOT devices belong to said first user;
 generating, by said processor for said first user, an identification token comprising a barcode comprising a specified timeframe for execution;
 retrieving, by said processor via a video retrieval device, a visual image of an identification token scanned via a barcode reader;
 registering, by said processor in response to a command from a second user associated with said service provider system, said second user associated with said service provider system, wherein said registering said second user comprises retrieving identification information for said second user and a second user communication device belonging to said second user;
 receiving, by said processor from said first user via said first user communication device belonging to said first user, a request for a service provided by said service provider system;
 determining, by said processor based on analyzing said identification information, said visual image of said identification token, and results of said scanning, an authorization for said first user to access said service;
 generating, by said processor via said first user communication device, a first user security code for said first user;
 generating, by said processor via said second user communication device, a second service provider user security code for said second user;
 generating, by said processor, a command instructing said second user to proceed to a location of said first user; and
 transmitting, by said processor to said second user communication device, said command.

2. The method of claim 1, further comprising;
 detecting, by said processor in response to transmitting said request, a first user IOT device belonging to and within range of said first user communication device belonging to said first user;
 selecting, by said processor from said IOT devices belonging to said first user, said first user IOT device for verification;
 authorizing, by said processor in response to said selecting, said first user IOT device with respect to said IOT devices belonging to said first user; and
 confirming, by said processor based on results of said detecting and said authorizing, said request, wherein said receiving said request is performed in response to said confirming.

3. The method of claim 2, wherein said first user IOT device is randomly selected from said IOT devices belonging to said first user for verification.

4. The method of claim 2, wherein said first user IOT device is specifically selected from said IOT devices belonging to said first user for verification.

5. The method of claim 2, further comprising;
 additionally detecting, by said processor in response to transmitting said request, a second user IOT device belonging to and within range of said second user communication device belonging to said second user;

additionally selecting, by said processor from said IOT devices belonging to second user, said second user IOT device for verification;

additionally authorizing, by said processor in response to said additionally selecting, said second user IOT device with respect to said IOT devices belonging to said second user; and additionally confirming, by said processor based on results of said additionally detecting and said additionally authorizing, said request, wherein said receiving said request is performed in response to said additionally confirming.

6. The method of claim 1, wherein, upon receiving said command, said second user proceeds to and arrives at said location of said first user, and wherein said method further comprises;

transmitting, by said processor to said first user communication device, said second user security code;

providing, to said second user, said first user security code;

determining a security code match between said second user security code and said first user security code; and authorizing, based on said determining said security code match, service activities between said first user and said second user.

7. The method of claim 6, further comprising;

scanning, by said processor via said first user communication device, said TOT devices belonging to said second user;

receiving, by said processor in response to said scanning, first data identifying a second user TOT device belonging to and within range of said second user communication device belonging to said second user;

transmitting, by said processor to said second user communication device, second data identifying a first user TOT device belonging to and within range of said first user communication device belonging to said first user;

first detecting, by said processor via said first user communication device, said second user TOT device;

second detecting, by said processor via said second user communication device, said first user TOT device;

determining, by said processor, a first match between said first data and said second user TOT device located during said first detecting;

determining, by said processor, a second match between said second data and said first user TOT device located during said second detecting; and authorizing, based on said determining said security code match, determining said first match, and said determining said second match, service activities between said first user and said second user.

8. The method of claim 1, further comprising:

providing at least one support service for at least one of creating, integrating, hosting, maintaining, and deploying computer-readable code in the control hardware, said code being executed by the computer processor to implement: said registering said first user, said detecting and registering said IOT devices belonging to said first user, said storing said identification information for said first user, said registering said second user, said storing said identification information for said second user, and said receiving.

9. A computer program product, comprising a computer readable hardware storage device storing a computer readable program code, said computer readable program code comprising an algorithm that when executed by a processor of a hardware device implements a security determination method, said method comprising:

registering, by said processor in response to a command from a first user, said first user associated with a service provider system, wherein said registering said first user comprises retrieving identification information for said first user and a first user communication device belonging to said first user, and wherein said identification information for said first user comprises a first photograph of said first user and a temporary identification number comprising a specified expiration date and an associated number of times that said temporary identification number is used;

storing, by said processor within a database belonging to a service provider, said identification information for said first user and said first user communication device belonging to said first user and identification information for detected and registered TOT devices belong to said first user;

generating, by said processor for said first user, an identification token comprising a barcode comprising a specified timeframe for execution;

retrieving, by said processor via a video retrieval device, a visual image of an identification token scanned via a barcode reader;

registering, by said processor in response to a command from a second user associated with said service provider system, said second user associated with said service provider system, wherein said registering said second user comprises retrieving identification information for said second user and a second user communication device belonging to said second user;

receiving, by said processor from said first user via said first user communication device belonging to said first user, a request for a service provided by said service provider system;

determining, by said processor based on analyzing said identification information, said visual image of said identification token, and results of said scanning, an authorization for said first user to access said service;

generating, by said processor via said first user communication device, a first user security code for said first user;

generating, by said processor via said second user communication device, a second service provider user security code for said second user;

generating, by said processor, a command instructing said second user to proceed to a location of said first user; and transmitting, by said processor to said second user communication device, said command.

10. The computer program product of claim 9, wherein said method further comprises:

detecting, by said processor in response to transmitting said request, a first user IOT device belonging to and within range of said first user communication device belonging to said first user;

selecting, by said processor from said IOT devices belonging to said first user, said first user IOT device for verification;

authorizing, by said processor in response to said selecting, said first user IOT device with respect to said IOT devices belonging to said first user; and confirming, by said processor based on results of said detecting and said authorizing, said request, wherein said receiving said request is performed in response to said confirming.

11. The computer program product of claim 10, wherein said first user IOT device is randomly selected from said IOT devices belonging to said first user for verification.

12. The computer program product of claim 10, wherein said first user IOT device is specifically selected from said IOT devices belonging to said first user for verification.

13. The computer program product of claim 10, wherein said method further comprises:
- additionally detecting, by said processor in response to transmitting said request, a second user IOT device belonging to and within range of said second user communication device belonging to said second user;
- additionally selecting, by said processor from said IOT devices belonging to second user, said second user IOT device for verification;
- additionally authorizing, by said processor in response to said additionally selecting, said second user IOT device with respect to said IOT devices belonging to said second user; and
- additionally confirming, by said processor based on results of said additionally detecting and said additionally authorizing, said request, wherein said receiving said request is performed in response to said additionally confirming.

14. The computer program product of claim 9, wherein, upon receiving said command, said second user proceeds to and arrives at said location of said first user, and wherein said method further comprises;
- transmitting, by said processor to said first user communication device, said second user security code;
- providing, to said second user, said first user security code;
- determining a security code match between said second user security code and said first user security code; and
- authorizing, based on said determining said security code match, service activities between said first user and said second user.

15. The computer program product of claim 9, wherein said method further comprises:
- scanning, by said processor via said first user communication device, said IOT devices belonging to said second user;
- receiving, by said processor in response to said scanning, first data identifying a second user TOT device belonging to and within range of said second user communication device belonging to said second user;
- transmitting, by said processor to said second user communication device, second data identifying a first user TOT device belonging to and within range of said first user communication device belonging to said first user;
- first detecting, by said processor via said first user communication device, said second user TOT device;
- second detecting, by said processor via said second user communication device, said first user TOT device;
- determining, by said processor, a first match between said first data and said second user TOT device located during said first detecting;
- determining, by said processor, a second match between said second data and said first user TOT device located during said second detecting; and
- authorizing, based on said determining said security code match, determining said first match, and said determining said second match, service activities between said first user and said second user.

16. A security determination method comprising:
- registering, by a processor of a hardware device in response to a command from a first user, said first user, wherein said registering said first user comprises retrieving identification information for said first user, and wherein said identification information for said first user comprises a first photograph of said first user and a temporary identification number comprising a specified expiration date and an associated number of times that said temporary identification number is used;
- storing, by said processor within a data repository belonging to a service provider, said identification information for said first user;
- generating, by said processor for said first user, an identification token comprising a barcode comprising a specified timeframe for execution;
- retrieving, by said processor via a video retrieval device, a visual image of said identification token scanned via a barcode reader;
- receiving, by said processor from a second user via a first communication device, a replica token of said identification token and a request for a service provided by a service provider system;
- determining, by said processor based on analyzing said identification information, said visual image of said identification token, and results of said scanning, an authorization for said first user to access said service;
- generating, by said processor via said first user communication device, a first user security code for said first user;
- generating, by said processor via a second user communication device, a second service provider user security code for said second user;
- transmitting, by said processor to said second user communication device, a command instructing said second user to proceed to a location of said first user;
- detecting, by said processor, a first user TOT device belonging to said first user and within range of said first communication device;
- selecting, by said processor from IOT devices belonging to said first user, said first user IOT device for verification; and
- authorizing, by said processor in response to said selecting, said first user IOT device with respect to said IOT devices belonging to said first user.

17. The method of claim 16, further comprising;
- transmitting, by said processor to a second user communication device of a second user in response to results of said analyzing, said identification information for said first user.

* * * * *